(No Model.)
S. E. SMITH.
LUBRICATOR.
No. 464,443. Patented Dec. 1, 1891.
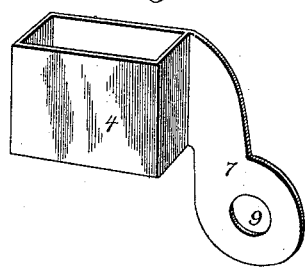
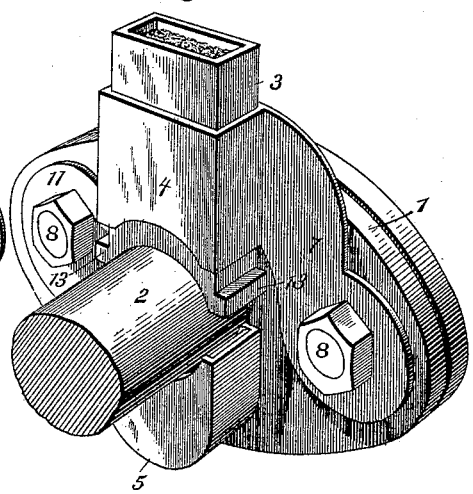
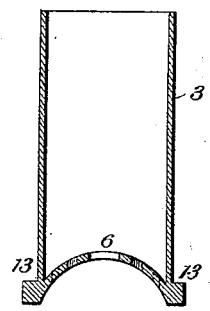
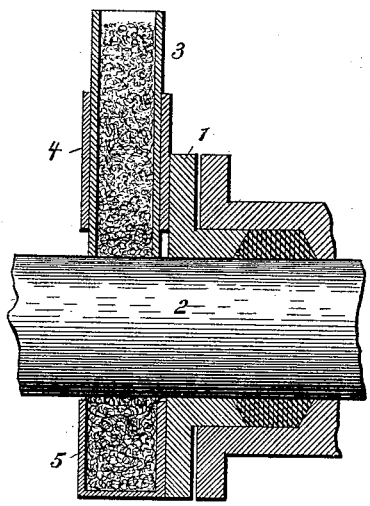
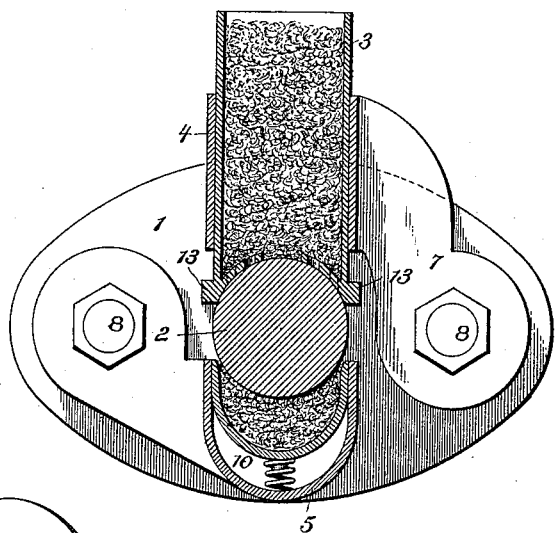
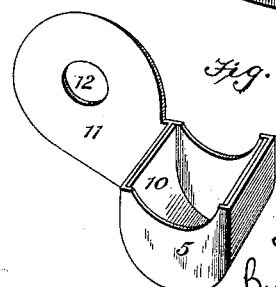
Witnesses
Inventor
Steven E. Smith
By Johnson & Johnson
his Attorneys

UNITED STATES PATENT OFFICE.

STEVEN EARNEST SMITH, OF BIRMINGHAM, ALABAMA, ASSIGNOR OF ONE-HALF TO ISAAC SIMPSON, OF SAME PLACE.

LUBRICATOR.

SPECIFICATION forming part of Letters Patent No. 464,443, dated December 1, 1891.

Application filed September 1, 1891. Serial No. 404,413. (No model.)

*To all whom it may concern:*

Be it known that I, STEVEN EARNEST SMITH, a citizen of the United States, residing at Birmingham, in the county of Jefferson and State of Alabama, have invented a new and useful Improvement in Lubricating Devices for Piston and Valve Rods, of which the following is specification.

My invention is a lubricating device of novel construction adapted for attachment to the gland or cover of a stuffing-box for pressing upon the packing around a piston or valve rod to make a steam-tight joint; and the object of my improvement is to render the bearing of the oil-holding device self-adjusting upon the rod, to accommodate such device to irregularities of the rod and thereby preserve a continual contact therewith, and to adapt such device for application to the gland of the joint-packing of the box by the bolts which secure the gland.

In the drawings I have shown my device as an attachment to the gland of the stuffing-box for lubricating the rod of a piston or valve to reduce friction from longitudinal movement of said rod and to lubricate the packing of said box.

In the drawings, Figure 1 is a perspective view of such device. Fig. 2 is a vertical section thereof in the line of the rod, and Fig. 3 is a vertical section of the device transversely of the rod, and Figs. 4, 5, and 6 show the separate parts.

The gland of the stuffing-box is indicated by 1 and the rod to be lubricated by 2, and it will be understood that my lubricating device is adapted for use with the ordinary stuffing-box gland now used on steam-cylinders and valve-chests.

The device consists of three separate and distinct parts—a box 3 for holding waste or capillary material which serves to absorb and retain the oil and supply it to the upper side of the rod, a sleeved bracket 4, which serves to receive and hold the box part in self-adjusting relation on the rod, and a cup part 5 for holding waste or capillary material which serves to catch and retain the oil which would drip from the rod and supply it to the under side thereof. The waste-containing-box part is preferably of rectangular form in cross-section, its bottom conforming to the circumference of the rod, is perforated, and is supported thereon to allow the oil to ooze through from the waste to the rod. An opening or slot 6 in the middle of this concave bottom permits the waste to extend through the bottom in contact with the rod. The sleeve 4 is made to fit snugly over the box part 3 and allow it to have free vertical adjustment therein. It has an arm or plate 7 projecting from one side flush with that side of the sleeve which is contiguous to the face of the gland, so that it may be secured to the latter by one of the bolts 8 which fasten the gland to the cylinder-head, and for this purpose this sleeve-arm has an opening 9, which registers with the gland-bolt. The under cup part 5 is open at its upper side, which is curved to conform to the circumference of the rod. It has a concave spring-sustained false bottom 10 and contains waste or capillary material to retain oil and to supply it to the under side of the rod. This cup also has an arm or plate 11 projecting therefrom in an opposite direction to the arm of the sleeve and flush with that side of the cup which is contiguous to the face of the gland, so that it may be secured to the latter by one of the bolts which fasten the gland to the cylinder-head, and for this purpose the cup-arm has an opening 12, which registers with the gland-bolt. The lubricating parts are thus secured in positions above and below the rod by the separate bolts of the gland at opposite sides of the rod, so that the under lubricating part will have a fixed relation to the rod and the upper lubricating box part will have a vertical self-adjusting bearing on the rod. This self-adjusting box part rests by its weight on the upper side of the rod, and is therefore free to rise and fall to conform to any inequality or irregularity of the rod, and the bearing-surface of the box will thereby have a continuous contact, as such bearing-surface, being of softer metal than the rod, will not wear the rod or stem and will prevent forming shoulders on the rod, which is very important in the preservation of metallic packing.

As the device is fastened to the outer face of the gland, the waste or capillary material in the under cup will be in contact with the gland at the joint of the rod therewith and the oil will thereby be carried into the stuffing-box by the movement of the rod, and as the oil is supplied by contact of the waste the lubrication is not cut off by the blowing of steam through the stuffing-box. While the oil is supplied to the upper side of the rod by gravity through the waste in the self-adjusting box, it is supplied to the under side of the rod by capillary attraction through the waste in the fixed cup, and it will be understood that this under supply is provided and maintained from the oil taken by the waste from the rod itself.

While the weight and position of the self-adjusting box which supplies the oil is ordinarily sufficient to safely retain it in the sleeve, yet as a means of preventing the box from being thrown out of the sleeve by a sudden jar or motion I form shoulders or flanges 13 on the lower end of the box, so as to abut against the lower end of the sleeve and thereby form stops in such event.

The oil is supplied to the self-adjusting box, which may be provided with a cover.

While I prefer to use the under cup as a part of the device, because it increases the lubricating-surface and saves oil which would otherwise be lost, yet it is obvious that this under-cup part may be dispensed with, as the self-adjusting waste-containing box part is complete in itself.

While I have described and prefer to secure the lubricating device directly to the outer side or face of the gland of a stuffing-box by the same bolts which secure the gland, yet it is obvious that the device may be secured to the stuffing-box or other fixed part. The advantage, however, of securing it to the gland is that no separate fastenings are required, and the adjustment of the gland carries the lubricating device with it, and the contiguous relation of the latter with the joint of the rod at the gland is maintained.

I claim—

1. A rod-lubricating device comprising a waste-containing self-adjusting box having a perforated bottom and resting freely upon said rod, and a fixed holding-sleeve for said box.

2. In a rod-lubricating device, the combination of a waste-containing self-adjusting box having a perforated bottom and resting freely upon said rod, a fixed holding-sleeve for said box, and a waste-containing cup having a fixed relation to the under side of said rod.

3. A rod-lubricating device comprising a waste-containing self-adjusting box having a perforated bottom and resting freely upon said rod and having side projecting shoulders or flanges at its lower end and a fixed holding-sleeve for said box above said shoulders, for the purpose stated.

4. In a rod-lubricating device, the combination of the waste-containing box having a perforated bottom and resting freely upon said rod, a sleeve for said box, having a perforated supporting-arm, and a waste-containing cup at the under side of said rod, having a perforated supporting-arm, with the gland of the stuffing-box and the fastening-bolts therefor, for the purpose stated.

5. The combination, with the gland of a stuffing-box and the fastening-bolts thereof, of a rod-lubricating device comprising a waste-containing self-adjusting box having a perforated bottom and resting freely upon said rod, and a sleeve for holding said box, provided with an arm having an opening registering with one of said gland-fastening bolts, substantially as described.

In testimony whereof I have hereunto signed this specification.

STEVEN EARNEST SMITH.

Witnesses:
DAVE SIMPSON,
E. L. CLARKSON.